Dec. 19, 1922.

F. J. ERICKSON.
STORAGE BATTERY INSULATOR.
FILED JULY 14, 1921.

1,439,155

INVENTOR
Freeman J. Erickson
BY HIS ATTORNEY

James F. Williamson

Patented Dec. 19, 1922.

1,439,155

UNITED STATES PATENT OFFICE.

FREEMAN J. ERICKSON, OF MINNEAPOLIS, MINNESOTA.

STORAGE-BATTERY INSULATOR.

Application filed July 14, 1921. Serial No. 484,798.

*To all whom it may concern:*

Be it known that I, FREEMAN J. ERICKSON, a citizen of the United States, residing at Minneapolis, in the county of Hennepin and State of Minnesota, have invented certain new and useful Improvements in Storage-Battery Insulators; and I do hereby declare the following to be a full, clear, and exact description of the invention, such as will enable others skilled in the art to which it appertains to make and use the same.

This invention relates to a storage battery, and particularly to an insulating device used therein. The invention is particularly designed to be used with storage batteries of the smaller type, such as used in automobiles and having the usual positive and negative plates, although it is within the scope of the invention to apply the same to storage batteries of any type and size which use the separate plates. It is well known to those skilled in the art that some trouble has been experienced with the insulators used to separate and insulate the plates from each other. Such insulators are frequently broken and often so affected by the liquid constituents of the battery as to become ineffective.

It is an object of this invention therefore to provide an insulator for the plates of a storage battery which is simple in structure, easily applied, and which will efficiently separate and insulate said plates.

It is a further object of the invention to provide such an insulator of rubber or similar material, which insulator will be very durable and can be used during practically the entire life of the battery.

Figure 1:
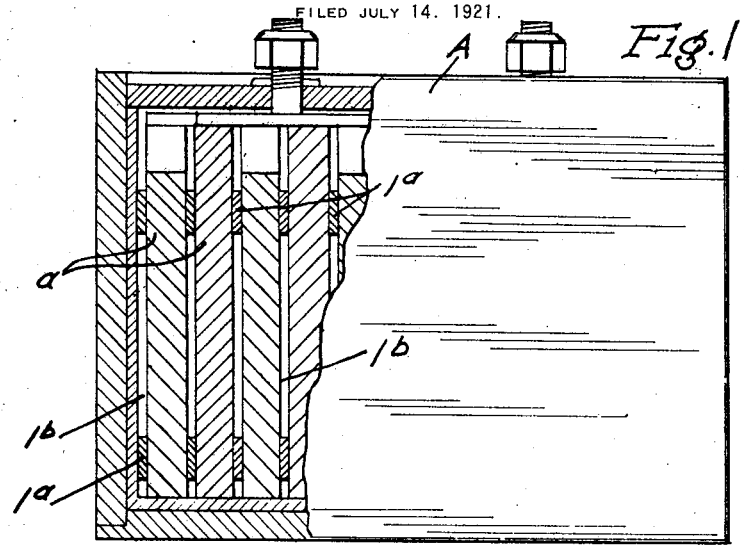
Figure 2:
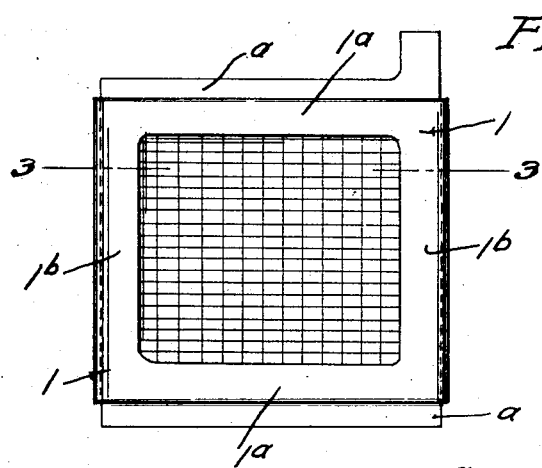
Figure 3:
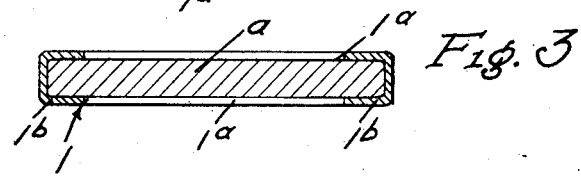

These and other objects and advantages of the invention will more fully appear from the following description made in connection with the accompanying drawings in which like reference characters refer to the same parts throughout the different views, and in which Fig. 1 is a view in side elevation in partial section illustrating a storage battery having the separate plates with the insulator applied thereto;

Fig. 2 is a view in side elevation of one of the plates with the insulator thereon; and Fig. 3 is a sectional view taken on the line 3—3 of Fig. 2.

Referring to the drawings, a storage battery of the usual type is shown in Fig. 1, comprising a casing A and the positive and negative plates *a* disposed therein. In accordance with the present invention, one set of the plates *a*, preferably the positive plates, is provided with the novel insulator. This insulator 1 comprises an elongated sleeve of oblong, or substantially rectangular form adapted to surround the plate *a* and be held thereon by its elasticity. The sleeve 1, at each side thereof, has a comparatively large opening formed therein through which the side of the plate is exposed. This opening thus forms the top and bottom strips 1ª connecting the portions 1ᵇ of the sleeve which extend around or enclose the ends or edges of the plates. Preferably, the sleeve is somewhat shorter in length than the length of the plate so as to be spaced from the top and bottom thereof.

From the above description it is seen that the insulators will be held firmly on the plates and the plates will be effectively separated and insulated from each other and yet a large surface will be exposed for the action of the liquid.

The device of this invention has been thoroughly tested in actual practice and it has been found that the insulator is practically unaffected by the constituents of the battery. The insulator can be quickly applied or removed and need not be destroyed when the battery is disassembled for any purpose.

It will, of course, be understood that various changes may be made in the form, details and arrangement of the device without departing from the scope of applicant's invention, which generally stated, consists in the matter shown and described and set forth in the appended claims.

What is claimed is:

1. An insulating device for storage battery plates comprising an oblong sleeve of flexible insulating material, said sleeve being open at its top and bottom and being cut away at each side to leave only a narrow strip adapted to surround the plate adjacent the edges thereof.

2. An article of manufacture comprising an insulating device for a storage battery plate consisting of a sleeve of thin elastic insulating material adapted to be stretched over said plate, said sleeve having each end open and an opening cut in each side thereof whereby the device will cover the front and back edges of the plate and a narrow strip surrounding each side adjacent said edges.

3. An insulating device for storage battery plates comprising a wide elastic insulating band adapted to be stretched around said plate and be held thereon by its elasticity, said plate having comparatively large openings formed in the sides thereof through which almost the entire sides of the plate are exposed and which leaves the front and back edges of the plate covered and a narrow insulating strip surrounding each side adjacent to said edges.

In testimony whereof I affix my signature.

FREEMAN J. ERICKSON.